N. GOTTEN.
Cotton Gin Feeder.
No. 239,380.                Patented March 29, 1881.
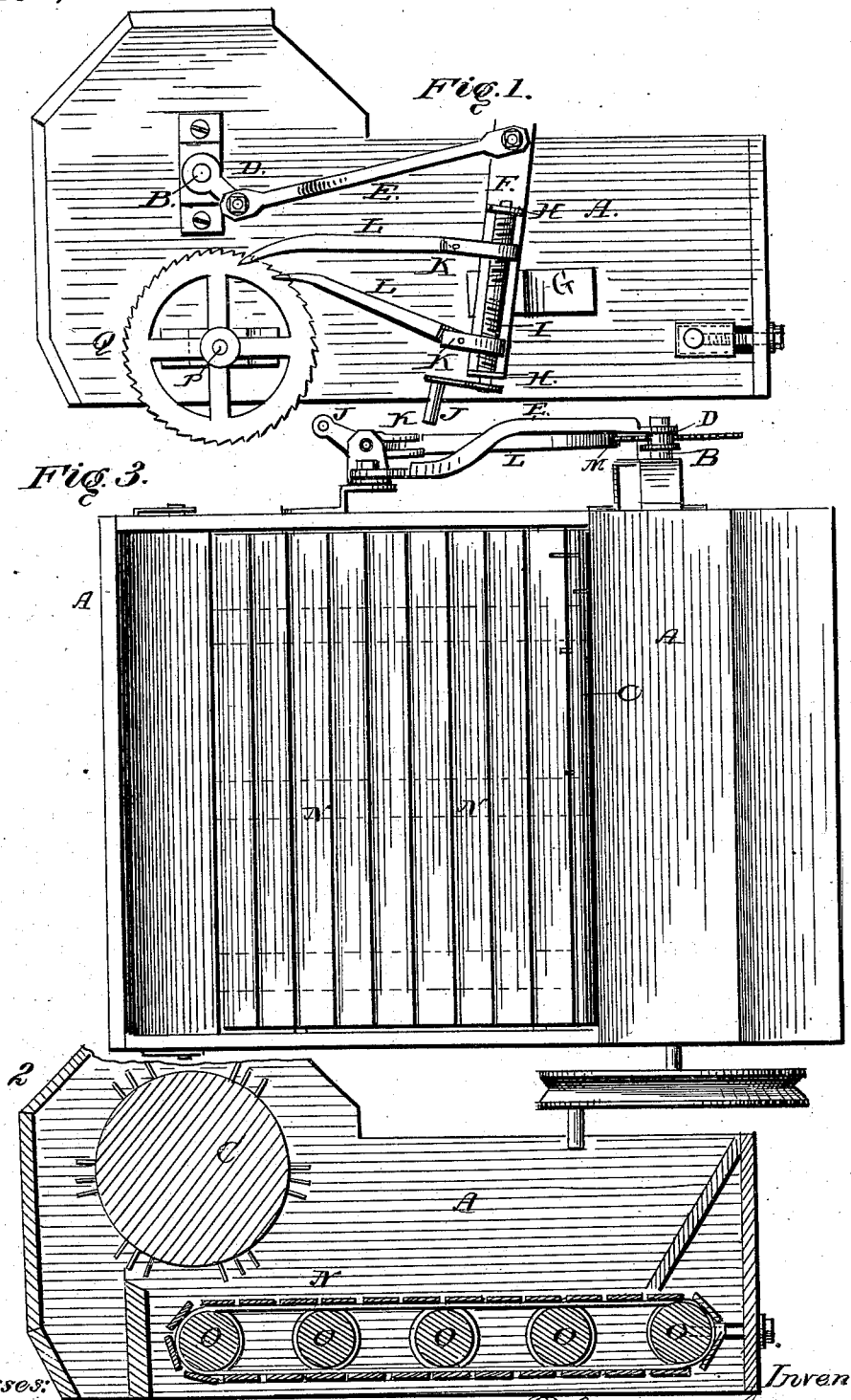

UNITED STATES PATENT OFFICE.

NICHOLAS GOTTEN, OF BARTLETT, TENNESSEE.

COTTON-GIN FEEDER.

SPECIFICATION forming part of Letters Patent No. 239,380, dated March 29, 1881.

Application filed January 6, 1880.

*To all whom it may concern:*

Be it known that I, N. GOTTEN, of Bartlett, in the county of Shelby and State of Tennessee, have invented certain new and useful Improvements in Cotton-Gin Feeders; and I do hereby declare that the following is a full, clear, and exact description of the invention, which will enable others skilled in the art to which it appertains to make and use the same, reference being had to the accompanying drawings, which form a part of this specification.

Figure 1 is a side view. Fig. 2 is a longitudinal sectional view, and Fig. 3 is a top view.

Corresponding parts in the several figures are denoted by like letters of reference.

This invention relates to cotton-gin feeders; and it consists in certain improvements in the construction of the same, which will be hereinafter fully described, and particularly pointed out in the claim.

In the annexed drawings, A represents the hopper or receptacle for seed-cotton, which is provided at one end with bearings for a shaft, B, carrying the spiked cylindrical roller C, by which the cotton is fed to the gin, and provided at one end with a band-wheel, crank, or other suitable means for communicating the motive power. At its other end the shaft B is provided with a crank, D, connected by a pitman or rod, E, to the upper end of a frame, F, pivoted to the side of hopper A. At points equidistant from its pivot G the frame F is provided with brackets H H, having bearings for a continuous right-and-left-hand-screw-threaded rod, I, carrying at one end a crank, J, by which it may be turned in its bearings. Upon the threaded rod I are adjusted nuts K K, the distance of which from each other and from the center of said rod may be increased or diminished by turning the crank J.

L L are pawls hinged to the nuts K K, and provided at their ends with notches M, by which they are adapted to fit upon a ratchet-wheel, and engage the teeth thereof, as will be hereinafter described.

N is an endless apron working upon rollers O O in the box or hopper A under the cylinder C. The shaft P of the forward roller, O, is provided at one end with a ratchet-wheel, Q, which is engaged by the pawls L L, and by means of which it is intermittently operated, thereby operating the feed-apron N.

From the foregoing description, taken in connection with the drawings hereto annexed, the operation of my invention will be readily understood. By properly adjusting the nuts K K the length of stroke of the pawls L L may be lengthened or shortened, thereby enabling the cotton to be fed more or less rapidly to the gin by the apron N and cylinder C.

The methods heretofore practiced of accomplishing an approximately similar result by a system of cone-pulleys, or like means, has been objectionable, not only on account of the loss of time and the wear upon belts and machinery in shifting, but especially because only certain established and no intermediate ratios of speed could be had; whereas by my improvement, the adjustment being gradual, any desired degree of speed may be obtained easily and without stopping the machinery.

Having thus described my invention, I claim and desire to secure by Letters Patent of the United States—

The cotton-gin feeder consisting of the hopper A, the frame F, pivoted thereto, and provided with bearing-brackets H, the continuous right-and-left-hand screw-rod I, engaging the bearings of the brackets, the nuts K K, adjustable on said screw-rod, the pawls L, pivoted to the nuts and engaging ratchet-wheel Q, and the pitman E, pivoted at the upper end of said bracket F, as shown and described.

In testimony that I claim the foregoing as my own I have hereto affixed my signature in presence of two witnesses.

NICHOLAS GOTTEN.

Witnesses:
F. P. SEDINGER,
J. C. ALSUP.